United States Patent
Prabhakar et al.

(10) Patent No.: US 11,812,375 B2
(45) Date of Patent: Nov. 7, 2023

(54) SIMULTANEOUS NETWORK SLICE USAGE VIA DUAL CONNECTIVITY

(71) Applicant: Apple Inc., Cupertino, CA (US)

(72) Inventors: Alosious Pradeep Prabhakar, Singapore (SG); Krisztian Kiss, Hayward, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 17/302,188

(22) Filed: Apr. 27, 2021

(65) Prior Publication Data

US 2021/0345235 A1 Nov. 4, 2021

Related U.S. Application Data

(60) Provisional application No. 63/018,936, filed on May 1, 2020.

(51) Int. Cl.
 *H04W 48/18* (2009.01)
 *H04W 76/15* (2018.01)
 *H04W 76/11* (2018.01)
 *H04W 8/08* (2009.01)
 *H04W 16/02* (2009.01)

(52) U.S. Cl.
 CPC .......... *H04W 48/18* (2013.01); *H04W 8/08* (2013.01); *H04W 76/11* (2018.02); *H04W 76/15* (2018.02); *H04W 16/02* (2013.01)

(58) Field of Classification Search
 CPC ....... H04W 48/18; H04W 8/08; H04W 76/11; H04W 76/15; H04W 16/02

USPC .......................................................... 370/328
 See application file for complete search history.

(56) References Cited

U.S. PATENT DOCUMENTS

| | | | |
|---|---|---|---|
| 2018/0324602 A1 | 11/2018 | Griot et al. | |
| 2019/0053148 A1* | 2/2019 | Lee ........ | H04W 48/18 |
| 2019/0335392 A1 | 10/2019 | Qiao et al. | |
| 2020/0015158 A1* | 1/2020 | So .......... | H04W 8/20 |
| 2021/0105308 A1* | 4/2021 | Bouazizi ..... | H04W 48/16 |
| 2021/0136675 A1* | 5/2021 | Lee ........ | H04W 60/00 |
| 2021/0160770 A1* | 5/2021 | Zhu ........ | H04W 48/18 |
| 2021/0211883 A1* | 7/2021 | Velev ...... | H04W 48/18 |
| 2022/0264505 A1* | 8/2022 | Ianev ...... | H04W 48/18 |
| 2022/0322221 A1* | 10/2022 | Ianev ...... | H04W 48/18 |
| 2023/0052699 A1* | 2/2023 | Ninglekhu .. | H04W 48/16 |

FOREIGN PATENT DOCUMENTS

| | | | |
|---|---|---|---|
| CA | 3075021 A1 * | 4/2019 | ........ H04W 16/04 |
| EP | 3417656 | 12/2018 | |
| WO | 2017/140341 | 8/2017 | |
| WO | 2019/229492 | 12/2019 | |
| WO | WO-2021138526 A1 * | 7/2021 | ........ H04W 48/16 |

\* cited by examiner

*Primary Examiner* — Mong-Thuy T Tran
(74) *Attorney, Agent, or Firm* — Fay Kaplun & Marcin, LLP (57) ABSTRACT

A network component of a radio access network (RAN) is configured to provide network slice information to a user equipment (UE). The network component receives an indication that a user equipment (UE) is requesting to access a network slice, determines a frequency associated with the network slice, identifies a cell within the RAN that operates on the frequency associated the network slice and transmits a message to the UE, wherein the message indicates the cell within the RAN that operates on the frequency associated with the network slice.

18 Claims, 6 Drawing Sheets

SIMULTANEOUS NETWORK SLICE USAGE VIA DUAL CONNECTIVITY

PRIORITY CLAIM/INCORPORATION BY REFERENCE

This application claims priority to U.S. Provisional Application Ser. No. 63/018,936 filed May 1, 2020 and entitled "Simultaneous Network Slice Usage via Dual Connectivity," the entirety of which is incorporated herein by reference.

BACKGROUND

A user equipment (UE) may connect to a network that includes multiple network slices. Generally, a network slice refers to an end-to-end logical network that is configured to provide a particular service and/or possess particular network characteristics. Each network slice may be isolated from one another but run on a shared physical network infrastructure. Thus, network slices may share network resources but facilitate different functionality.

The UE may be capable of utilizing multiple network slices simultaneously. To establish a connection to the network and access one or more network slices the UE may camp on a cell of the network. However, the UE may be camped on a cell that does not provide access to a particular network slice that the UE is interested in accessing.

SUMMARY

Some exemplary embodiments are related to a network component of a radio access network (RAN) configured to perform operations. The operations include receiving an indication that a user equipment (UE) is requesting to access a network slice, determining a frequency associated with the network slice, identifying a cell within the RAN that operates on the frequency associated the network slice and transmitting a message to the UE, wherein the message indicates the cell within the RAN that operates on the frequency associated with the network slice.

Other exemplary embodiments are related to a network component of a core network configured to perform operations. The operations include receiving an indication that a user equipment (UE) is requesting to access a network slice and determining a frequency associated with the network slice. The operations may further include transmitting a message to a radio access network (RAN), wherein the message indicates the frequency associated with the network slice. The operations may further include transmitting a message to the UE, wherein the message indicates at least one allowed network slice selection assistance information (NSSAI) for a public land mobile network (PLMN) associated with the core network.

DETAILED DESCRIPTION

The exemplary embodiments may be further understood with reference to the following description and the related appended drawings, wherein like elements are provided with the same reference numerals. The exemplary embodiments relate to a user equipment (UE) using multiple network slices simultaneously.

The exemplary embodiments are described with regard to the UE. However, reference to a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a fifth generation (5G) network that includes network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose.

Those skilled in the art will understand that 5G may support use cases such as enhanced mobile broadband (eMBB), massive machine type communication (mMTC) and ultra-reliable low latency communication (URLLC). Each of these types of use cases may relate to various different types of applications and/or services. A network slice may be characterized by a type of use case, a type of application and/or service or the entity that provides the application and/or service via the network slice. However, any example in this description that characterizes a network slice in a specific manner is only provided for illustrative purposes. Throughout this description, reference to a network slice may represent any type of end-to-end logical network that is configured to serve a particular purpose and implemented on the 5G physical infrastructure.

The UE may be configured to perform any of a wide variety of different tasks. Thus, the UE may be configured to utilize one or more network slices. For example, the UE may utilize a first network slice for carrier services (e.g., voice, multimedia messaging service (MMS), Internet, etc.) and another network slice for a service provided by a third-party. To provide an example, the third-party may be the manufacturer of the UE that provides services such as, but not limited to, messaging, streaming multimedia, video calls, etc. In another example, the third-party may be an entity managing a digital platform (e.g., social media, e-commerce, streaming media, etc.). In a further example, the third-party may be an entity providing services for Internet of Things (IoT) devices.

A network slice may be identified by single network slice selection assistance information (S-NSSAI). Each S-NSSAI may be associated with a public land mobile network (PLMN) and may include the slice service type (SST) and a slice descriptor (SD). The SST may identify the expected behavior of the corresponding network slice with regard to services, features and characteristics. Those skilled in the art will understand that the SST may be associated with a standardized SST value. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and NSSAI may generally refer to one or more network slices.

As indicated above, a network slice may serve a wide variety of different purposes. However, the configured purpose of a network slice is beyond the scope of the exemplary embodiments. Thus, the exemplary embodiments are not limited to any particular type of network slice. Instead, the exemplary embodiments relate to providing the UE with access multiple network slices simultaneously.

Slice isolation is one aspect of network slicing. This generally refers to one network slice is not to have an impact on another network slice. To achieve slice isolation, the network may configure a particular network slice to only be accessed via one or more particular frequency bands. To provide a general example, frequency band n1 may support access to S-NSSAI A, frequency band n3 may support access to S-NSSAI B, frequency band n78 may support access S-NSSAI C and frequency band n256 may support access to at least the set of S-NSSAI A, S-NSSAI B and S-NSSAI C. This example is not intended to limit the exemplary embodiments in any way. Instead, this example is merely provided as a general example of the relationship between a frequency band and S-NSSAI.

To access a particular network slice, the UE may camp on a cell of the 5G network. If the cell operates on a frequency band that is configured to provide access to a particular network slice, the UE may access the network slice via the cell. If the cell does not operate on the frequency band, the UE may be unable to access the network slice via the cell. Accordingly, under conventional circumstances, a scenario may arise where the UE is camped on a cell that is not capable of providing access to all of the network slices that the UE is interested in accessing. The exemplary embodiments relate to a mechanism that is configured to provide the UE with a network connection that is capable of supporting access to multiple network slices.

The exemplary embodiments are described with regard to dual connectivity (DC). Those skilled in the art will understand that DC relates to the UE being configured with a secondary cell group (SCG). Each SCG may represent a channel that facilitates communication between the UE and the network over a particular frequency band. A plurality of SCGs may correspond to the same frequency band, each SCG may correspond to a different band or a combination thereof. Further, each SCG has a particular bandwidth, the more SCGs the UE is configured with the more bandwidth that is available for communications with the network.

As will be described in more detail below, the network may configure the UE with DC where a connection to one cell group provides access to one or more network slices and a connection to another cell group provides access to a different set of one or more network slices. To provide an example, at a first time, the UE may be camped on a first cell of a 5G NR network. The first cell may operate on frequency band n1 which may facilitate access to S-NSSAI A. At a second time, an application running on the UE may be launched. The application may be configured to receive network services associated with S-NSSAI B. However, in this example, S-NSSAI B is not configured for access on frequency band n1. To provide the UE with access to S-NSSAI B, the network may configure the UE with a secondary cell group (SCG) that includes at least one cell that operates on frequency band n2 which may facilitate access to S-NSSAI B. Thus, by configuring the UE with DC, the network may provide the UE with simultaneous access to network slices that are deployed on different frequency bands.

The exemplary embodiments relate to establishing a DC configuration that is capable of providing the UE with access to multiple network slices simultaneously. In a first aspect, the exemplary embodiments are described with regard to a radio access network (RAN) based mechanism configuring the UE with this type of DC. In a second aspect, the exemplary embodiments are described with regard to an access and mobility management function (AMF) based mechanism configuring the UE with this type of DC. Specific examples of both of these exemplary aspects will be described in detail below.

Figure 1:
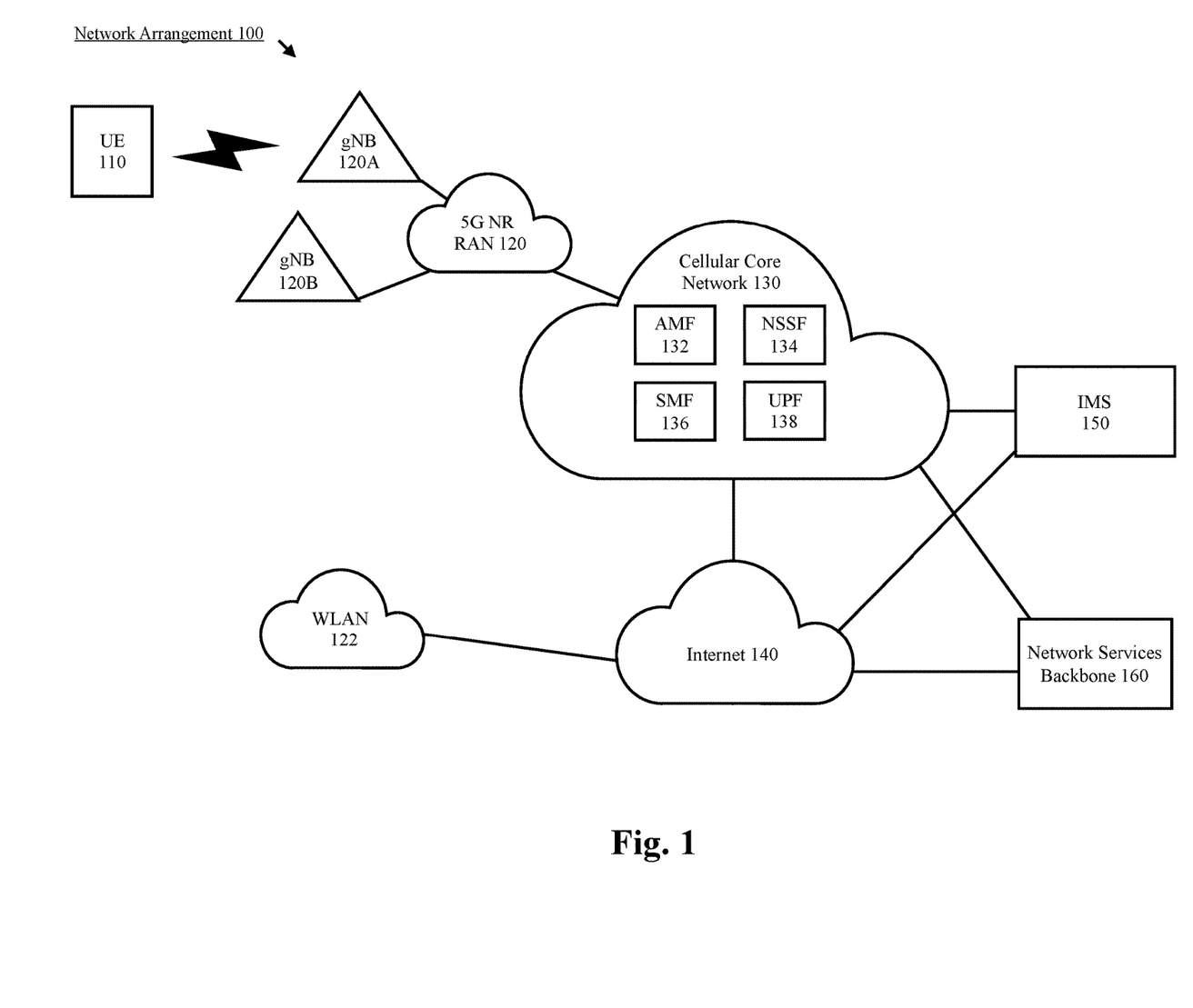
FIG. 1 shows an exemplary network arrangement according to various exemplary embodiments.

FIG. 1 shows a network arrangement 100 according to the exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate with one or more networks. In the example of the network configuration 100, the network with which the UE 110 may wirelessly communicate is a 5G NR radio access network (RAN) 120. However, it should be understood that the UE 110 may also communicate with other types of networks (e.g. 5G cloud RAN, LTE-RAN, legacy cellular network, WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communication with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a next generation Node B (gNB) 120A and/or the gNB 120B. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A or the gNB 120B). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network 130. The cellular core network 130 may be considered to be the interconnected set of components that manages the operation and traffic of the cellular network. In this example, the components include an access and mobility management function (AMF) 132, a network slice selection function (NSSF) 134, a session management function (SMF) 136 and a user plane function (UPF) 138. However, an actual cellular core network may include various other components performing any of a variety of different functions.

The AMF 132 performs operations related to mobility management such as, but not limited to, paging, non-access stratum (NAS) management and registration procedure management between the UE 110 and the cellular core network 130. The AMF 132 may be equipped with one or more communication interfaces to communicate with other network components (e.g., network functions, RANs, UEs, etc.). The exemplary embodiments are not limited to an AMF that performs the above reference operations. Those skilled in the art will understand the variety of different types of operations an AMF may perform. Further, reference to a single AMF 132 is merely for illustrative purposes, an actual network arrangement may include any appropriate number of AMFs.

The NSSF 134 performs operates related to network slices. For example, the NSSF 134 may select a set of network slice instances serving the UE 110. The NSSF 134 may also manage one or more databases that include a mapping table of S-NSSAI and the frequency bands in which the S-NSSAI is allowed to operate. The NSSF 134 may be equipped with one or more communication interfaces to communicate with other network components (e.g., network functions, RANs, UEs, etc.). The exemplary embodiments are not limited to an NSSF that performs the above reference operations. Those skilled in the art will understand the variety of different types of operations an NSSF may perform. Further, reference to a single NSSF 134 is merely for illustrative purposes, an actual network arrangement may include any appropriate number of NSSFs.

The SMF 136 performs operations related to session management such as, but not limited to, session establishment, session release, IP address allocation, policy and quality of service (QoS) enforcement, etc. The SMF 136 may be equipped with one or more communication interfaces to communicate with other network components (e.g., network functions, RANs, UEs, etc.). The exemplary embodiments are not limited to an SMF that performs the above reference operations. Those skilled in the art will understand the variety of different types of operations a SMF may perform. Further, reference to a single SMF 136 is merely for illustrative purposes, an actual network arrangement may include any appropriate number of SMFs.

The UPF 138 performs operations related packet data unit (PDU) session management. For example, the UPF 136 may facilitate a connection between the UE 110 and a data network corresponding to a network slice. The UPF 138 may be equipped with one or more communication interfaces to communicate with other network components (e.g., network functions, RANs, UEs, etc.). The exemplary embodiments are not limited to an UPF that performs the above reference operations. Those skilled in the art will understand the variety of different types of operations an UPF may perform. Further, reference to a single UPF 138 is merely for illustrative purposes, an actual network arrangement may include any appropriate number of UPFs.

The network arrangement 100 also includes the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
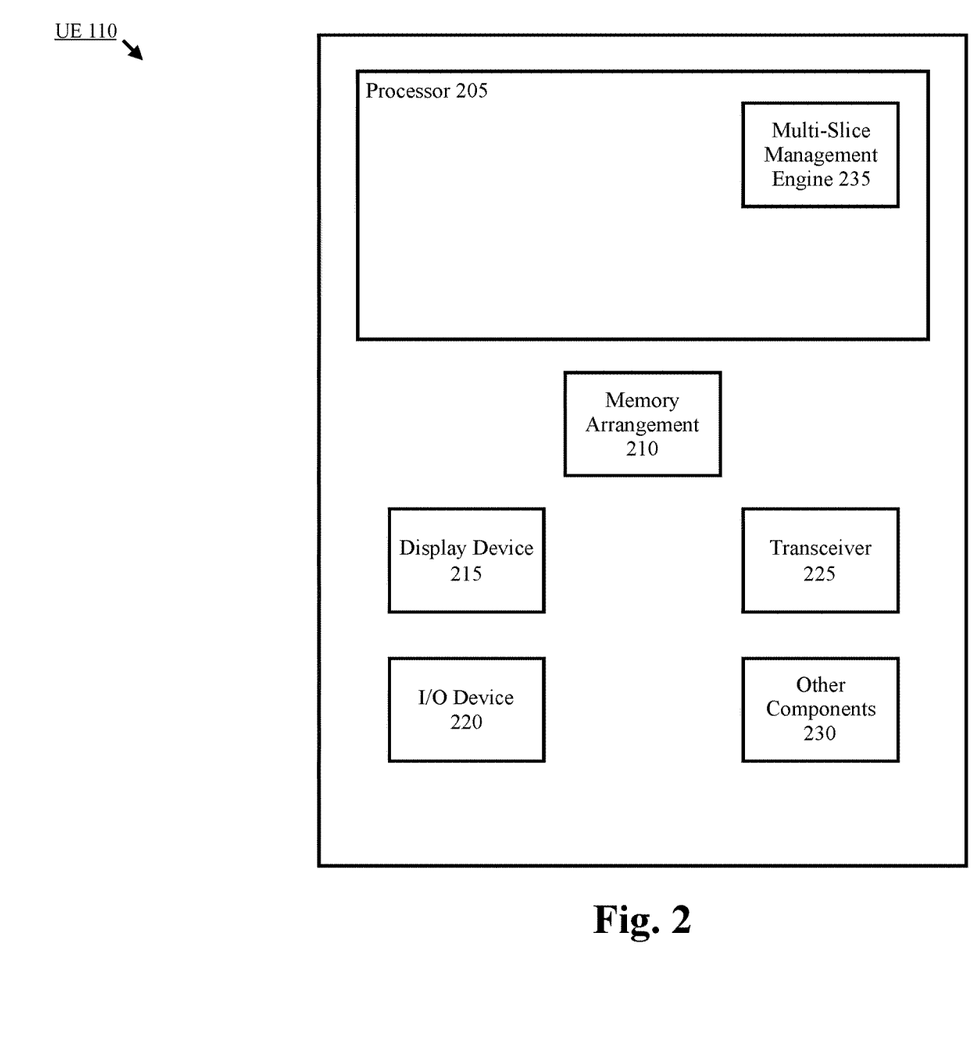
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include multi-slice management engine 235. The multi-slice management engine 235 may perform various operations related to accessing multiple network slices simultaneously.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE- RAN 120, the 5G NR-RAN 122, the legacy RAN 124 and the WLAN 126. Accordingly, the transceiver 225 may operate on a variety of different frequencies or channels (e.g., set of consecutive frequencies).

As mentioned above, the exemplary embodiments relate to utilizing multiple network slices simultaneously. The examples provided below relate to a scenario in which the UE 110 is interested in utilizing network slices that are deployed on different frequency bands. To differentiate between network slices, reference will be made to two network slices, S-NSSAI "A" and S-NSSAI "B." To differentiate between frequency bands, reference will be made to frequency band "n1" supporting S-NSSAI A and frequency band "n2" supporting S-NSSAI B. However, these examples are merely provided for illustrative purposes and are not intended to limit the exemplary embodiments in any way. Those skilled in the art will understand that in an actual network arrangement more than two network slices may be configured and each configured network slice may be deployed on one or more frequency bands.

The exemplary embodiments describe mechanisms related to configuring the UE 110 with DC (or multiple SCGs) to make sure that simultaneous usage of multiple network slices is possible at the UE 110. With regard to DC within the context of the network arrangement 100, the gNB 120A may represent one or more cells corresponding to a master cell group (MCG) and the gNB 120B may represent one or more cells corresponding to a secondary cell group (SCG). However, in an actual network arrangement, DC may be configured by any appropriate combination of cells within the same RAT (e.g., 5G) or different RATs (e.g., 5G, LTE, WLAN, etc.).

In a first aspect, the exemplary mechanisms relate to provisioning a network component with information indicating a mapping of S-NSSAI supported by the corresponding public land mobile network (PLMN) to the one or more frequency bands with which the S-NSSAI are allowed to operate. For example, the information may indicate that within the PLMN S-NSSAI A is deployed on frequency band n1 and S-NSSAI B is deployed in frequency band n2. In some embodiments, the mapping is stored by a network component of the 5G NR-RAN 120. In other embodiments, the mapping is stored by the AMF 132. The mapping of S-NSSAI may then be used by the network to configure the UE 110 with DC (or multiple SCGs or multiple component carrier (CCs)) such that multiple network slices that are each deployed over different frequency bands may be used by the UE 110 simultaneously.

In a second aspect, the exemplary embodiments relate to how the network components may communicate with one another to provide the UE 110 with access to multiple network slices simultaneously. For example, the UE 110 may be camped on the gNB 120A using frequency band n1 and configured with a PDU session associated with S-NSSAI A. While camped, the UE 110 may want to receive a network service associated with S-NSSAI B. However, in this example, since the gNB 120A does not operate on frequency band n2, the UE 110 may not access S-NSSAI B via the gNB 120A. The exemplary embodiments will be described with regard to configuring the UE 110 with DC such that a PDU session associated with S-NSSAI B may be established via the SCG (e.g., gNB 120B).

Figure 3:
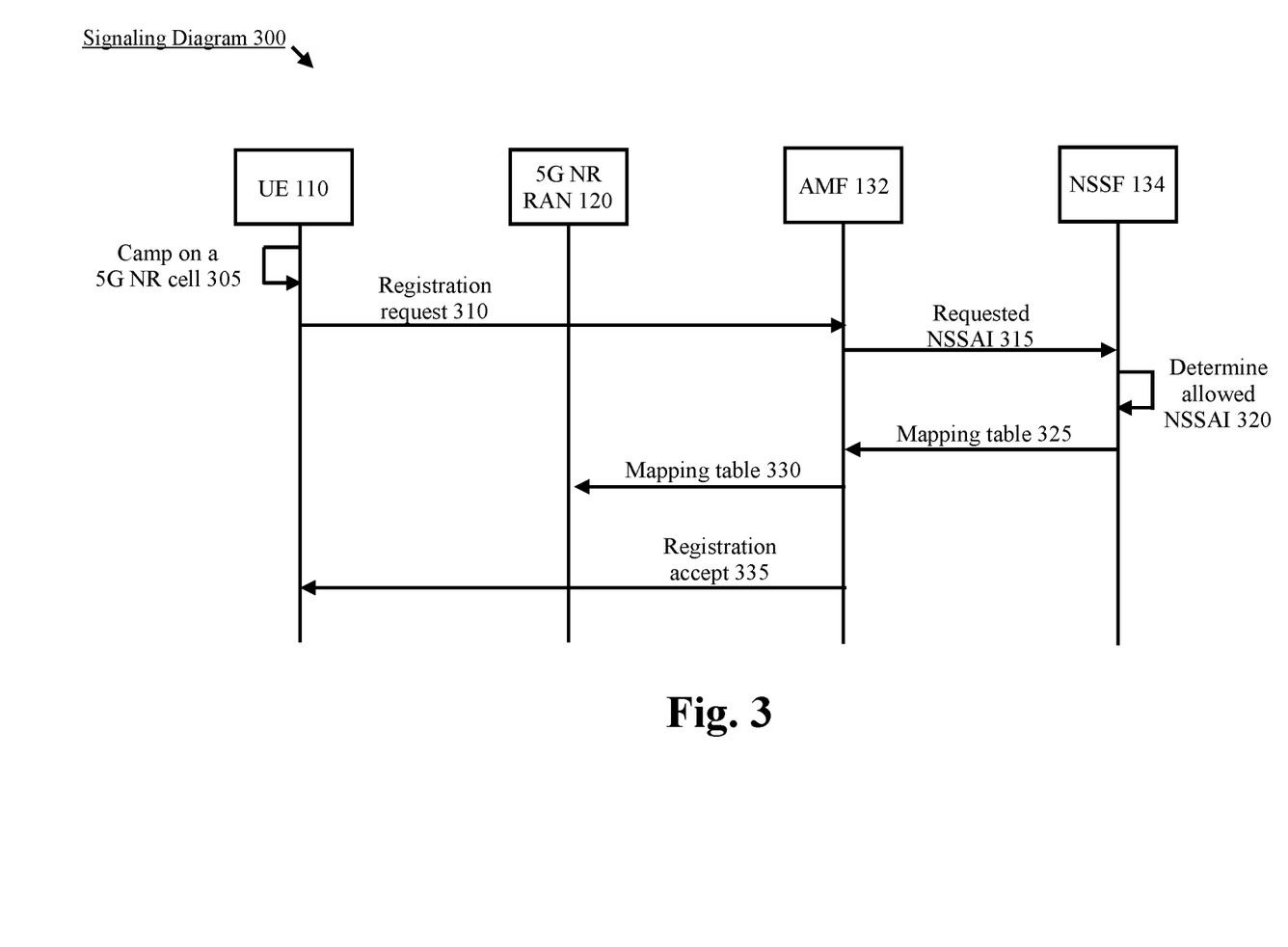
FIG. 3 shows a signaling diagram for provisioning the 5G new radio (NR) radio access network (RAN) with a network slice mapping according to various exemplary embodiments.

FIG. 3 shows a signaling diagram 300 for provisioning the 5G NR RAN 120 with network slice mapping according to various exemplary embodiments. The signaling diagram 300 will be described with regard to the network arrangement 100 of FIG. 1 and the UE 110 of FIG. 2.

The signaling diagram 300 includes the UE 110, the 5G NR RAN 120, the AMF 132 and the NSSF 134. As will be described in more detail below, the NSSF 134 may maintain a database that includes a mapping of S-NSSAI and the frequency with which the S-NSSAI are allowed to operate on for this PLMN. This information may be provided to the 5G NR RAN 120 where it may be utilized for configuring the UE 110 with DC. An example of how the 5G NR RAN 120 may utilize the mapping of S-NSSAI and frequency is described below with regard to the signaling diagram 400 of FIG. 4.

In 305, the UE 110 camps on a cell of the 5G NR RAN 120. For example, the UE 110 may camp on the gNB 120A. In 310, the UE 110 transmits a registration request to the AMF 132. For example, to receive the full scope of functionality normally available to the UE 110 via the network connection, the UE 110 may register with the network. The registration request may include an indication of one or more S-NSSAI (e.g. NSSAI) that the UE 110 is configured to utilize.

In 315, the AMF 132 transmits an indication of the requested NSSAI to the NSSF 134. As mentioned above, the NSSF 134 may maintain a database that includes a mapping of the S-NSSAI and the frequency band with which they operate on within this PLMN.

In 320, the NSSF 134 determines the NSSAI that the UE 110 is allowed to access within the PLMN. The NSSF 134 may determine the allowed NSSAI for the UE 110 using the mapping and any other appropriate information.

In 325, the NSSF 134 transmits a mapping table that includes the allowed NSSAI for the UE 110 to the AMF 132. For each allowed S-NSSAI an indication of one or more frequencies is provided.

In 330, the AMF 132 forwards the mapping table to the 5G NR RAN 120. The 5G NR RAN 120 maintains a copy of the mapping table such that it may be utilized to configure the UE 110 with DC. An example of how the mapping table may be utilized will be described below with regard to the signaling diagram 400 of FIG. 4.

In 335, the AMF 132 transmits a registration accept message to the UE 110. The registration accept message may include an indication of the allowed NSSAI for the PLMN. Thus, the UE 110 is now aware of the S-NSSAI that may be accessed via the 5G NR RAN 120.

Figure 4:
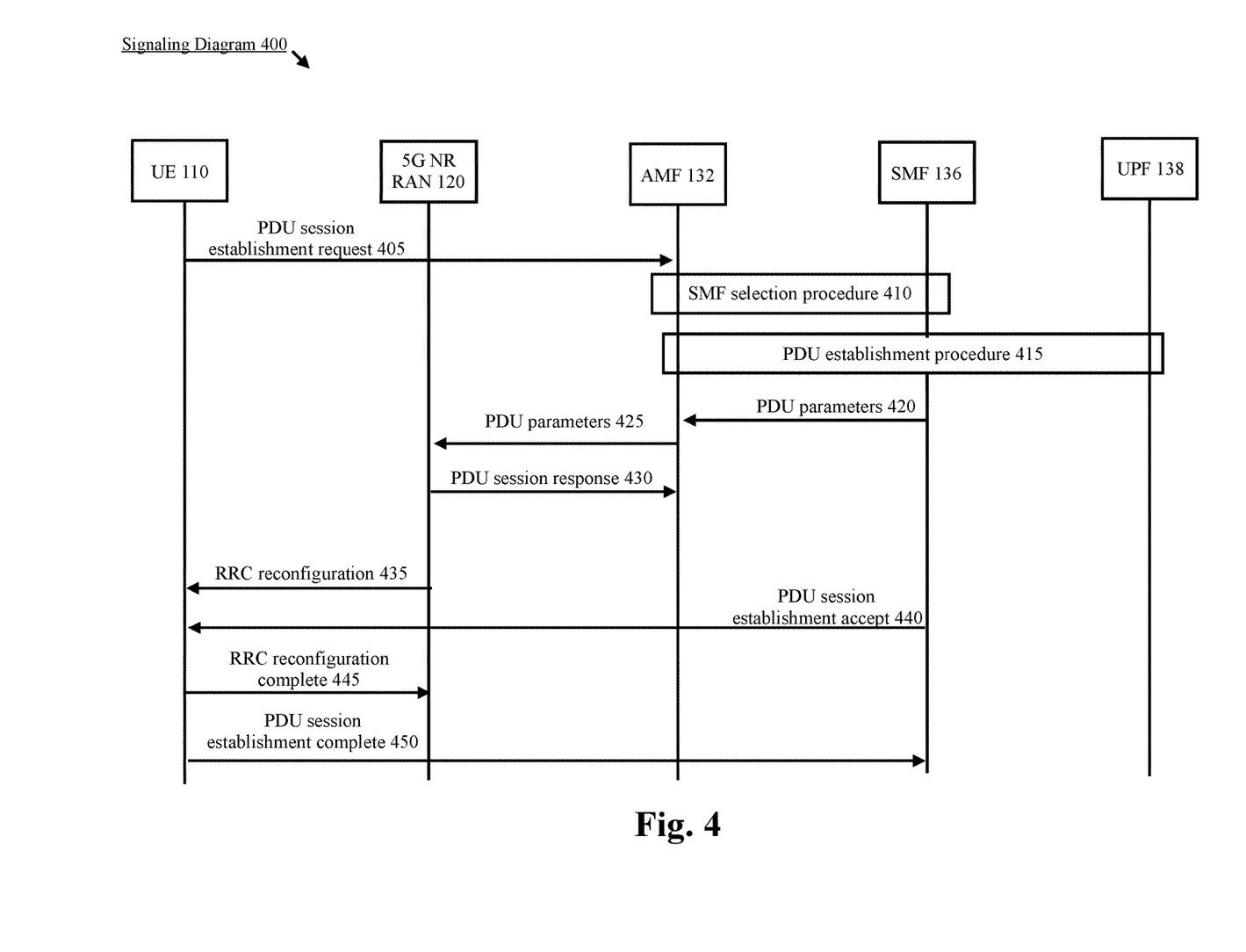
FIG. 4 shows a signaling diagram for configuring the UE with a secondary cell (SCG) according to various exemplary embodiments.

FIG. 4 shows a signaling diagram 400 for configuring the UE 110 with a SCG according to various exemplary embodiments. The signaling diagram 400 will be described with regard to the network arrangement 100 of FIG. 1, the UE 110 of FIG. 2 and the signaling diagram 300 of FIG. 3.

The signaling diagram 400 includes the UE 110, the 5G NR RAN 120, the AMF 132, the SMF 136 and the UPF 138. Initially, consider the following exemplary scenario. The signaling diagram 300 has been performed and thus, the 5G NR RAN 120 has a copy of the mapping table. The UE 110 is currently camped on the gNB 120A which operates on frequency band n1. Further, the UE 110 has already established a PDU session associated with S-NSSAI A.

While camped, an application is launched on the UE 110 that is configured to receive a network service associated with S-NSSAI B. As indicated above, S-NSSAI B may be accessed on frequency band n2 which is not provided by the currently camped gNB 120A. To ensure that the UE 110 may utilize S-NSSAI B without interrupting the current PDU session associated with S-NSSAI A, the network may configure the UE 110 with DC where a master cell group (MCG)

including the gNB 120A provides service associated with S-NSSAI A and a SCG provides service associated with S-NSSAI B.

In 405, the UE 110 transmits a PDU session establishment request to the AMF 132. The PDU session establishment request may indicate that the UE 110 wants to access the S-NSSAI B. In 410, the AMF 132 and the SMF 136 perform an SMF selection procedure. The SMF selection procedure is beyond the scope of the exemplary embodiments, those skilled in the art will understand the signaling exchange and operations that may be performed for the SMF selection procedure.

In 415, the AMF 132, SMF 136 and the UPF 138 perform a PDU establishment procedure. The PDU establishment procedure is beyond the scope of the exemplary embodiments, those skilled in the art will understand the signaling exchange and operations that may be performed for the PDU establishment procedure.

In 420, the SMF 136 provides the AMF 132 with various parameters for the PDU session. These parameters may include, but are not limited to, a PDU session ID, tunnel information, a quality of service (QoS) profile S-NSSAI, etc.

In 425, the AMF 132 may provide the 5G NR RAN 120 with various parameters for the PDU session. These parameters may include, but are not limited to, a PDU session ID, tunnel information, a quality of service (QoS) profile, S-NSSAI, etc. In some embodiments, the above mentioned parameters may be sent in a PDU Session Resource Setup Request.

Here, the 5G NR RAN 120 may compare the S-NSSAI received from the AMF 132 with the mapping table to identify the frequency in which S-NSSAI B is allowed to operate. In this example, the gNB 120A does not operate on frequency band n2 which is associated with the S-NSSAI B. Thus, the 5G NR RAN 120 configures the UE 110 with a SCG that includes the gNB 120B because the gNB 120B operates on frequency band n2 which supports access to S-NSSAI B. There may be scenarios in which the currently camped cell (e.g., gNB 120A) supports the frequency band associated with the S-NSSAI. In this type of scenario, the gNB 120A may provide access to both S-NSSAI and the SCG may not be configured.

In 430, the 5G NR RAN 120 transmits a PDU session resource setup response to the AMF 132 indicating that the 5G NR RAN 120 is capable of supporting the requested PDU session.

In 435, the 5G NR RAN 120 transmits a radio resource control (RRC) reconfiguration message to the UE 110. The RRC reconfiguration message may indicate to the UE 110 that a DRB associated with SCG is to be configured for the UE 110.

As mentioned above, if 5G NR RAN 120 identifies that the frequency band of the serving cell (e.g., gNB 120A) is an allowed frequency for the requested network slice (e.g., S-NSSI B) based on the comparison to the mapping table, the 5G NR RAN 120 may not configure a SCG. In this type of scenario, the 5G NR RAN 120 may construct the RRC reconfiguration message to include the packet data convergence protocol (PDCP) as per the QoS profile received in 425.

In this example, since the mapping table indicates that the serving cell does not provide access to the request S-NSSAI, the 5G NR RAN 120 may configure the SCG. In this type of scenario, the 5G NR RAN 120 may construct the RRC reconfiguration message to include the following information. A multi-radio dual connectivity (MRDC)-Secondary Cell Group Config indication may be included which contains RRC reconfiguration by secondary node (SN)-gNBs that operate on the allowed frequency for the requested S-NSSAI (e.g., S-NSSAI B). The RRC reconfiguration message may also include a radio Bearer Config indication which indicates a data radio bearer (DRB) identity that may be used for the PDU session associated with the requested S-NSSAI, a core network (CN) Association, a service data adaption protocol (sdap)-config, a PDU session ID which uniquely identify the requested S-NSSAI and a mapped QoS flow associated with the PDU session. The RRC reconfiguration message may also contain a security key (sk)-counter.

The DRB information and the PDU session ID may be used for routing data traffic associated with the S-NSSAI B. Thus, the inclusion of this type of information in the RRC reconfiguration message may allow the UE 110 to route data packets for the network service associated with the S-NSSAI B over the SCG (e.g., gNB 120B). Accordingly, data traffic associated with the S-NSSAI A may flow over the MCG (e.g., gNB 120A) and data traffic associated with S-NSSAI B may flow over the SCG configured by the RRC reconfiguration (e.g., gNB 120B).

In 440, the SMF 136 transmits a PDU establishment accept message to the UE 110. In 445, the UE 110 transmits an RRC reconfiguration complete message to the 5G NR RAN 120. This may indicate to the 5G NR RAN 120 that the UE 110 is camped on the SCG (e.g., the gNB 120B). In 450, the UE 110 transmits a PDU session establishment complete message to the SMF 136. This completes PDU session establishment and thus, a PDU session associated with the S-NSSAI B is configured for the UE 110. Accordingly, the UE 110 is now configured with DC and able to access the network service associated with the S-NSSAI B via the SCG.

Signaling diagrams 300-400 illustrated embodiments in which the 5G NR RAN 120 is provisioned with the S-NSSAI mapping table. The signaling diagrams 500-600 provided below will demonstrate embodiments in which the AMF 132 is provisioned with the S-NSSAI mapping table.

Figure 5:
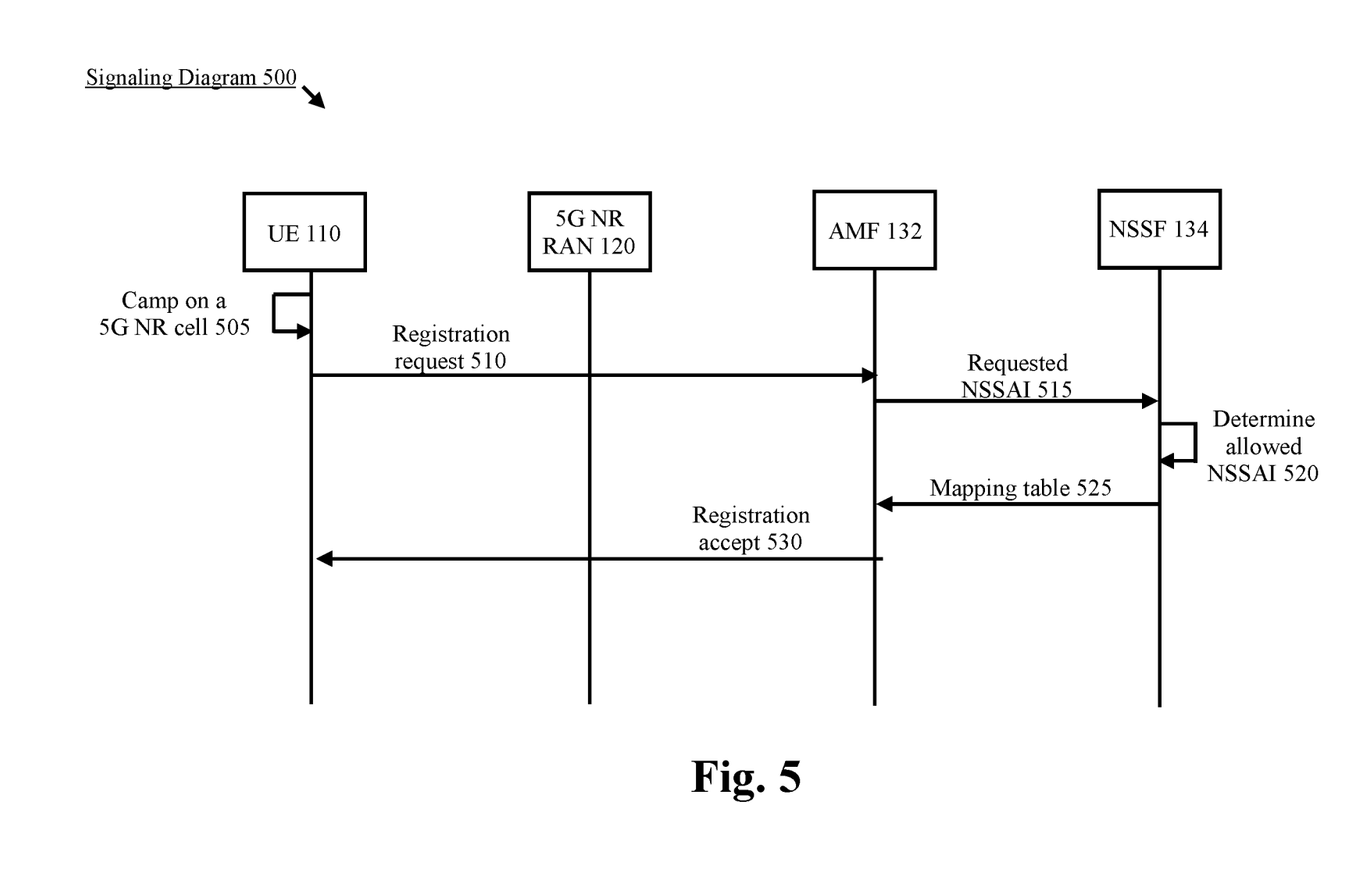
FIG. 5 shows a signaling diagram for provisioning access and mobility management function (AMF) with network slice mapping according to various exemplary embodiments.

FIG. 5 shows a signaling diagram 500 for provisioning the AMF 132 with network slice mapping according to various exemplary embodiments. The signaling diagram 300 will be described with regard to the network arrangement 100 of FIG. 1 and the UE 110 of FIG. 2.

The signaling diagram 500 includes the UE 110, the 5G NR RAN 120, the AMF 132 and the NSSF 134. As mentioned above with regard to the signaling diagram 300, the NSSF 134 may maintain a database that includes a mapping of S-NSSAI and the frequency with which the S-NSSAI are allowed to operate on for this PLMN. In this example, instead of providing this information to the 5G NR RAN 120, the mapping is provided to the AMF 132. An example of how the AMF 132 may utilize the mapping of S-NSSAI and frequency is described below with regard to the signaling diagram 600 of FIG. 6.

In 505, the UE 110 camps on a cell of the 5G NR RAN 120. For example, the UE 110 may camp on the gNB 120A. In 510, the UE 110 transmits a registration request to the AMF 132. The registration request may include an indication of NSSAI that the UE 110 is configured to utilize.

In 515, the AMF 132 transmits an indication of the requested NSSAI to the NSSF 134. As mentioned above, the NSSF 134 may maintain a database that includes a mapping of the S-NSSAI and the frequency band with which they operate on within this PLMN.

In 520, the NSSF 134 determines the NSSAI that the UE 110 is allowed to access within the PLMN. In 525, the NSSF 134 transmits a mapping table that includes the allowed NSSAI to the AMF 132. For each allowed S-NSSAI an indication of one or more operating frequencies is provided. The AMF 132 maintains a copy of the mapping table such that it may be utilized to configure the UE 110 with DC. An example of how the mapping table may be utilized will be described below with regard to the signaling diagram 600 of FIG. 6.

In 530, the AMF 132 transmits a registration accept message to the UE 110. The registration accept message may include an indication of the allowed NSSAI for the PLMN. Thus, the UE 110 is now aware of the S-NSSAI that may be accessed via the 5G NR RAN 120.

Figure 6:
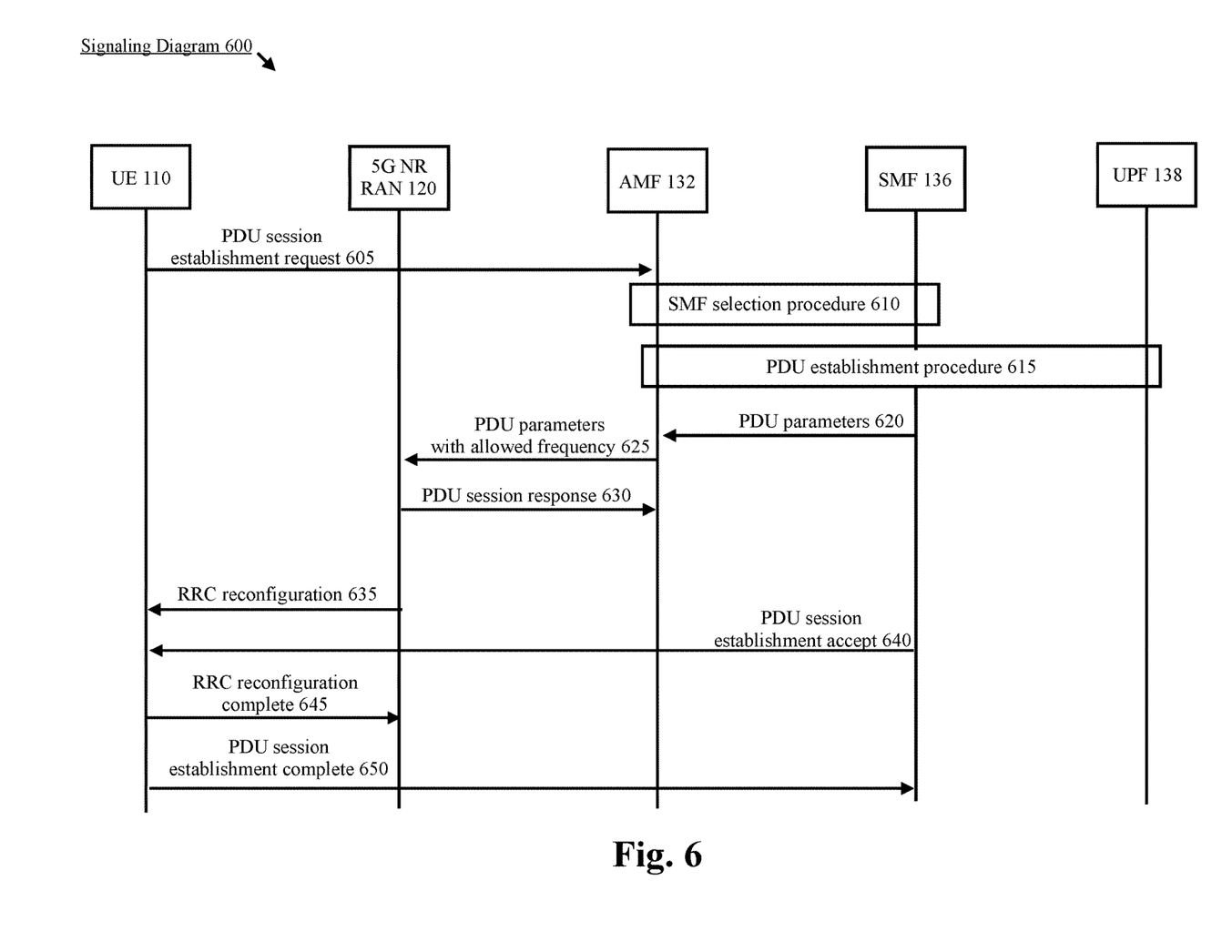
FIG. 6 shows a signaling diagram for configuring the UE with a SCG according to various exemplary embodiments.

FIG. 6 shows a signaling diagram 600 for configuring the UE 110 with a SCG according to various exemplary embodiments. The signaling diagram 600 will be described with regard to the network arrangement 100 of FIG. 1, the UE 110 of FIG. 2 and the signaling diagram 500 of FIG. 5.

The signaling diagram 600 includes the UE 110, the 5G NR RAN 120, the AMF 132, the SMF 136 and the UPF 138. Initially, consider the following exemplary scenario. The signaling diagram 500 has been performed and thus, the AMF 132 has a copy of the mapping table. The UE 110 is currently camped on the gNB 120A which operates on frequency band n1. Further, the UE 110 has already established a PDU session associated with S-NSSAI A.

While camped, an application is launched on the UE 110 that is configured to receive a network service associated with S-NSSAI B. As indicated above, S-NSSAI B may be accessed on frequency band n2 which is not provided by the currently camped gNB 120A. To ensure that the UE 110 may utilize S-NSSAI B without interrupting the current PDU session associated with S-NSSAI A, the network may configure the UE 110 with DC where a master cell group (MCG) including the gNB 120A provides service associated with S-NSSAI A and a SCG provides service associated with S-NSSAI B.

In 605, the UE 110 transmits a PDU session establishment request to the AMF 132. The PDU session establishment request may indicate that the UE 110 wants to access the S-NSSAI B. In 610, the AMF 132 and the SMF 136 perform an SMF selection procedure. In 615, the AMF 132 and the UPF 138 perform a PDU establishment procedure.

In 620, the SMF 136 provides the AMF 132 with various parameters for the PDU session. These parameters may include, but are not limited to, a PDU session ID, tunnel information, a quality of service (QoS) profile S-NSSAI, etc. Here, the AMF 132 may compare the S-NSSAI received from the SMF 136 with the mapping table to identify the frequency in which S-NSSAI B is allowed to operate. The AMF 132 may forward the allowed frequency (and other parameters) to the 5G NR RAN 120.

In 625, the AMF 132 may provide the 5G NR RAN 120 with various parameters for the PDU session. These parameters may include, but are not limited to, a PDU session ID, tunnel information, a quality of service (QoS) profile, S-NSSAI, etc. As indicated above, these parameters may also include the frequency or the list of frequencies that the S-NSSAI B is allowed to operate on. In some embodiments, the above mentioned parameters may be sent in a PDU Session Resource Setup Request.

In this example, the gNB 120A does not operate on frequency band n2 which is the allowed frequency for the S-NSSAI B as indicated by the AMF 132 in the PDU Session Resource Setup Request. Thus, the 5G NR RAN 120 configures the UE 110 with a SCG that includes the gNB 120B because the gNB 120B operates on frequency band n2 which supports access to S-NSSAI B. There may be scenarios in which the currently camped cell (e.g., gNB 120A) supports the frequency band associated with the S-NSSAI. In this type of scenario, the gNB 120A may provide access to both S-NSSAI and the SCG may not be configured.

In 630, the 5G NR RAN 120 transmits a PDU session resource setup response to the AMF 132 indicating that the 5G NR RAN 120 is capable of supporting the requested PDU session.

In 635, the 5G NR RAN 120 transmits an RRC reconfiguration message to the UE 110. The RRC reconfiguration message may indicate to the UE 110 that a SCG is to be configured for the UE 110.

As mentioned above, if 5G NR RAN 120 identifies that the frequency band of the serving cell (e.g., gNB 120A) is an allowed frequency for the requested network slice (e.g., S-NSSI B) to operate on based on the indication included in the PDU Session Resource Setup Request received in 625, the 5G NR RAN 120 may not configure a SCG. In this type of scenario, the 5G NR RAN 120 may construct the RRC reconfiguration message to include the packet data convergence protocol (PDCP) as per the QoS profile received in 425.

In this example, since the indication of the allowed frequency to operate for the S-NSSAI B is not a frequency that the serving cell (e.g., gNB 120A) operate on, the 5G NR RAN 120 may configure the SCG. In this type of scenario, the 5G NR RAN 120 may construct the RRC reconfiguration message to include the following information. A MRDC-Secondary Cell Group Config indication may be included which contains RRC reconfiguration by SN-gNBs that operate on the allowed frequency for the requested S-NSSAI (e.g., S-NSSAI B). The RRC reconfiguration message may also include a radio Bearer Config indication which indicates a DRB identity that may be used for the PDU session associated with the requested S-NSSAI, a CN Association, a service data sdap-config, a PDU session ID which uniquely identify the requested S-NSSAI and a mapped QoS flow associated with the PDU session. The RRC reconfiguration message may also contain a security key (sk)-counter.

The DRB information and the PDU session ID may be used for routing data traffic associated with the S-NSSAI B. on both uplink and downlink directions. Thus, the inclusion of this type of information in the RRC reconfiguration message may allow the UE 110 to route data packets for the network service associated with the S-NSSAI B over the SCG (e.g., gNB 120B). Accordingly, data traffic associated with the S-NSSAI A may flow over the MCG (e.g., gNB 120A) and data traffic associated with S-NSSAI B may simultaneously flow over the SCG configured by the RRC reconfiguration (e.g., gNB 120B).

In 640, the SMF 136 transmits a PDU establishment accept message to the UE 110. In 645, the UE 110 transmits an RRC reconfiguration complete message to the 5G NR RAN 120. This may indicate to the 5G NR RAN 120 that the UE 110 is camped on the SCG (e.g., the gNB 120B). In 650, the UE 110 transmits a PDU session establishment complete message to the SMF 136. This completes PDU session establishment and thus, a PDU session associated with the S-NSSAI B is configured for the UE 110. Accordingly, the UE 110 is now configured with DC and able to access the network service associated with the S-NSSAI B via the SCG.

The above examples described a UE 110 using multiple network slices via DC. However, the exemplary embodiments are not limited to DC and may also apply to carrier aggregation. For example, the gNB 120A may be a primary cell (PCell) providing the UE 110 with a primary component carrier (PCC). Like the examples provided above, the PCell may operate on frequency band n1 which supports access to S-NSSAI A. If the UE 110 wants to access S-NSSAI B, the network would configure the UE 110 with a secondary component carrier (SCC) that operates on frequency band n2 which supports S-NSSAI B. A mapping table of S-NSSAI and frequency bands would still be utilized by the network components to identify which frequencies support which S-NSSAI. Thus, the network may utilize the mapping table to provide the UE 110 with a SCC that provides access to S-NSSAI B. Accordingly, like the examples provided above, the UE 110 may utilize multiple network slices simultaneously where a first set of one or more cells provides access to first S-NSSAI using a first set of CCs and a second set of one or more cells provides access to a second different S-NSSAI using a second set of CCs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at an access and mobility management function (AMF):
   receiving a request for a network slice from a user equipment (UE) that is connected to a first cell of a radio access network (RAN) operating on a first frequency;
   determining that the network slice is available on a second frequency and not available on the first frequency;
   receiving network slice information from a network slice selection function (NSSF) comprising an indication that the network slice is available via a second cell within the RAN that operates on the second frequency, wherein the network slice information includes a mapping of network slices supported by a public land mobile network (PLMN) to one or more frequencies the network slices are allowed to operate on; and
   transmitting a message to the UE, wherein the message indicates that the network slice is available via the second cell within the RAN that operates on the second frequency.

2. The method of claim 1, further comprising:
   receiving a packet data unit (PDU) session resource setup request.

3. The method of claim 1, wherein a secondary cell group (SCG) is configured to include the second cell within the RAN that operates on the second frequency.

4. The method of claim 3, wherein the SCG is identified in the message.

5. The method of claim 4, wherein the message further includes a PDU session identity and a dedicated radio bearer (DRB) identity associated with the network slice.

6. The method of claim 1, wherein the message is a radio resource control (RRC) reconfiguration message.

7. The method of claim 6, wherein the RRC reconfiguration message includes a PDU session identity and a dedicated radio bearer (DRB) identity associated with the network slice and wherein the UE routes data traffic over the SCG using the PDU session identity and the DRB identity.

8. The method of claim 1, wherein the second cell within the RAN that operates on the second frequency is configured as a secondary component carrier (SCC) for the UE.

9. The method of claim 8, wherein traffic associated with the network slice is routed over the SCC and traffic associated with a further network slice is routed over a primary component carrier (PCC) of a further cell.

10. The method of claim 1, further comprising:
    transmitting, after receiving the request from the UE, a query to the NSSF for the network slice information.

11. The method of claim 1, further comprising:
    transmitting, prior to receiving the request from the UE, a query to the NSSF for the network slice information.

12. A access and mobility management function (AMF) configured to perform operations comprising:
    receiving a request for a network slice from a user equipment (UE) that is connected to a first cell of a radio access network (RAN) operating on a first frequency;
    determining that the network slice is available on a second frequency and not available on the first frequency; and
    receiving network slice information from a network slice selection function (NSSF) comprising an indication that the network slice is available via a second cell within the RAN that operates on the second frequency, wherein the network slice information includes a mapping of network slices supported by a public land mobile network (PLMN) to one or more frequencies the network slices are allowed to operate on; and
    transmitting a message to the UE, wherein the message indicates that the network slice is available via the second cell within the RAN that operates on the second frequency.

13. The AMF of claim 12, wherein the operations further comprise:
    transmitting a second message to the radio access network (RAN), wherein the message indicates the second frequency is associated with the network slice.

14. The AMF of claim 12, wherein the message further indicates at least one allowed network slice selection assistance information (NSSAI) for the PLMN associated with a core network.

15. The network component of claim 12, wherein the network slice information includes a mapping of the network slice to one or more frequencies the network slice is allowed to operate on.

16. The network component of claim 12, wherein the message further comprises a PDU session ID and a single network slice selection assistance information (S-NSSAI).

17. The method of claim 12, further comprising:
 transmitting, after receiving the request from the UE, a query to the NSSF for the network slice information.

18. The method of claim 12, further comprising:
 transmitting, prior to receiving the request from the UE, a query to the NSSF for the network slice information.

* * * * *